May 19, 1953  J. NANTT  2,638,700
GOPHER TRAP
Filed June 29, 1951  2 Sheets-Sheet 1

INVENTOR
JOHN NANTT,
BY
McMorrow, Berman & Davidson
ATTORNEYS

May 19, 1953   J. NANTT   2,638,700
GOPHER TRAP
Filed June 29, 1951   2 Sheets-Sheet 2
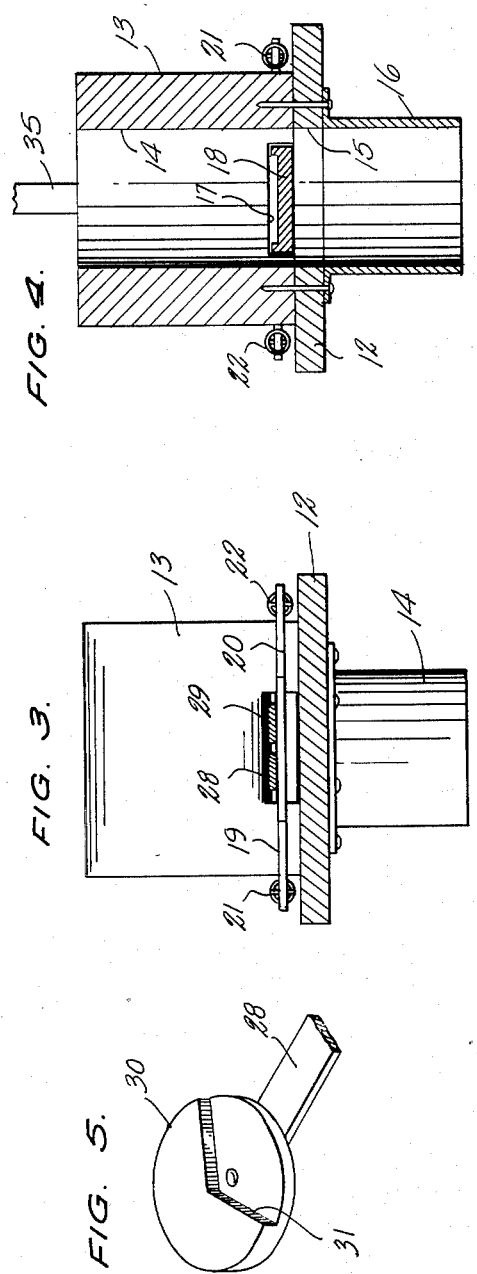
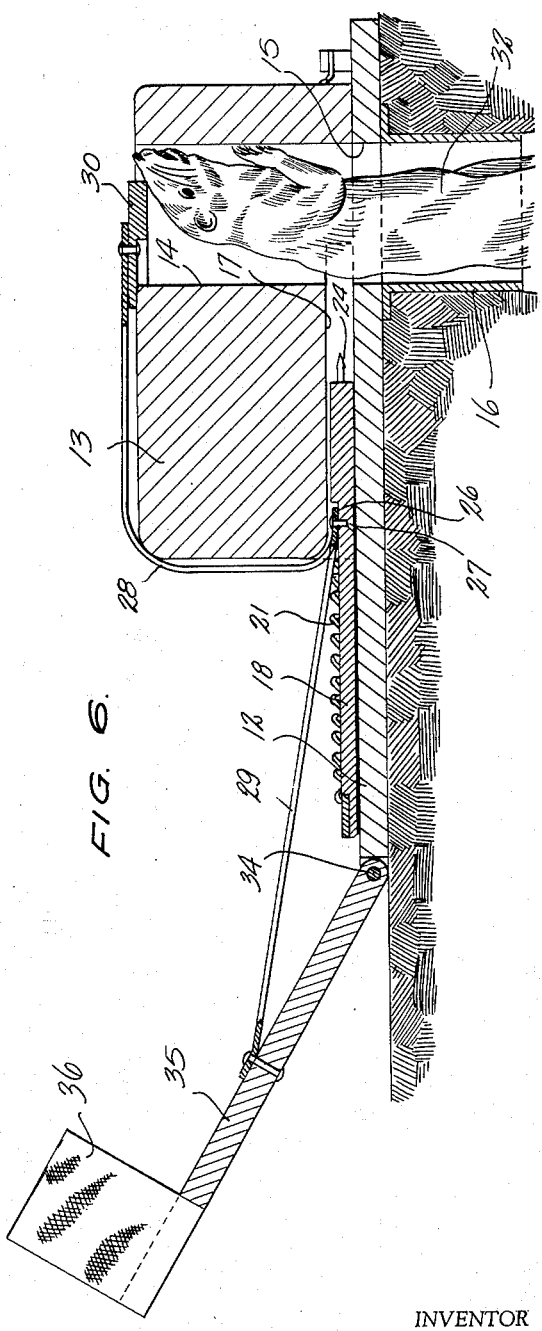
INVENTOR
JOHN NANTT,
BY McMorrow, Berman & Davidson
ATTORNEYS Patented May 19, 1953

2,638,700

UNITED STATES PATENT OFFICE 2,638,700

GOPHER TRAP

John Nantt, Hebron, N. Dak.

Application June 29, 1951, Serial No. 234,247

3 Claims. (Cl. 43—80)

1

This invention relates to animal traps, and more particularly to an improved gopher trap.

A main object of the invention is to provide a novel and improved animal trap especially adapted for trapping gophers and similar rodents, the improved trap being simple in construction, involving relatively few parts, and being reliable in operation.

A further object of the invention is to provide an improved gopher trap which is inexpensive to manufacture, which is sturdy in construction, which provides a signal when a gopher has been caught therein, and which is easy to set.

Further objects and advantages of the invention will become apparent from the following description and claims, and from the accompanying the drawings, wherein:

Figure 3 is a cross-sectional view taken on the line 3—3 of Figure 2;

Figure 4 is a cross-sectional view taken on the line 4—4 of Figure 2;

Figure 5 is an enlarged perspective detail view of the catch element employed in the trap of Figures 1 to 4;

Figure 6 is a longitudinal cross-sectional view taken on the line 6—6 of Figure 1, showing the trap in set position immediately prior to being sprung by a gopher.

Figure 1:
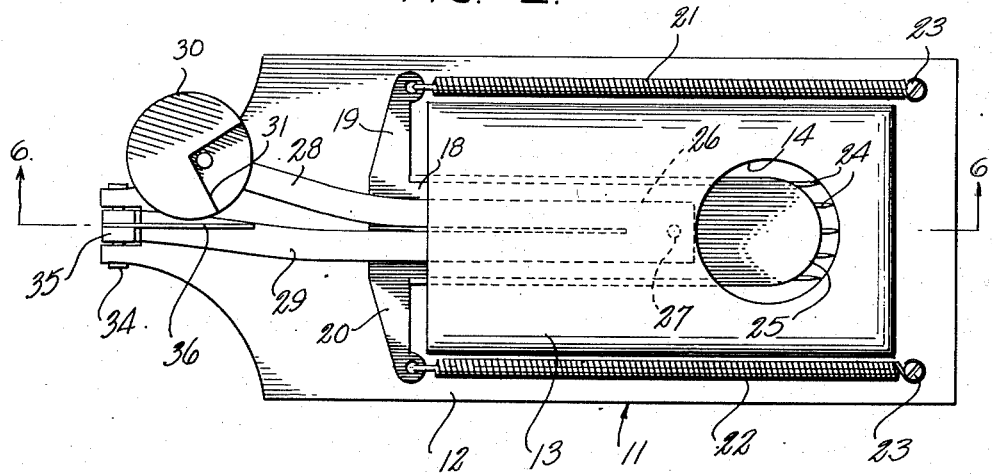
Figure 1 is a top plan view of an improved gopher trap constructed in accordance with the present invention.

Referring to the drawings, the gopher trap is designated generally at 11 and comprises a base member 12 on which is secured a block member 13 of substantial thickness. The block member 13 is formed with a vertical bore 14 and the base member 12 is formed with an opening 15 registering with and of similar size and shape to the bore 14. Secured to the under side of the base member 12 in registry with the opening 15 and bore 14 is the vertical depending tube 16 which is adapted to be inserted into the opening of a gopher burrow in the manner shown in Figure 6, whereby the passage defined by aperture 15 and bore 14 will register with the burrow opening.

The block member 13 is formed with a horizontal slot 17 communicating with bore 14, and slidably positioned in the slot 17 is an elongated plate member 18 formed at its outer end with the laterally extending arms 19 and 20. The ends of the arms 19 and 20 are connected by respective coil springs 21 and 22 to outstanding screws

2

23, 23 engaged in the forward corner portions of the base member 12. As shown in Figure 1, the coil springs 21 and 22 are disposed outwardly adjacent the longitudinal sides of the block member 13 and act to urge the plate member 18 inwardly in bore 17, whereby the forward end of the plate member is urged through the bore 14. The forward end of said plate member is provided with a plurality of pointed spurs or prongs 24, said forward end being arcuately curved, as shown at 25, and the spurs 24 being arranged arcuately, so that their ends are simultaneously engageable with the inside surface of the cylindrical bore 14.

Designated at 26 is a length of leather or rawhide which is secured at 27 to the plate member 18. The flexible member 26 is longitudinally slit to define two sections, shown respectively at 28 and 29. Secured to the end of the section 28 is a disc member 30 which is formed with the V-shaped shoulder 31 and which is adapted to be engaged in the top end of the wall of the bore 14 in the manner shown in Figure 6, to partially cover said top end and to releasably hold the plate member 18 in an outwardly retracted position, shown in Figure 6. As shown in Figure 6, when the device is thus set, the prongs 24 are removed entirely from the bore 14 and a free vertical passage is defined by tube 16, opening 15 and bore 14, through which an animal may move. The disc member 30 partly covers the top opening of bore 14, so that the animal, shown at 32 in Figure 6, sees the disc member 30 as a partial obstruction to the top opening of the vertical passage defined by member 16, opening 15 and bore 14. It will be readily apparent that if the animal attempts to move upwardly in the vertical passage thus defined, the disc member 30 will be pushed out of engagement with the top end of bore 14, releasing the plate member 18, whereupon said plate member will be moved inwardly by the springs 21 and 22, and the animal will be caught by the prongs 24.

Figure 2:
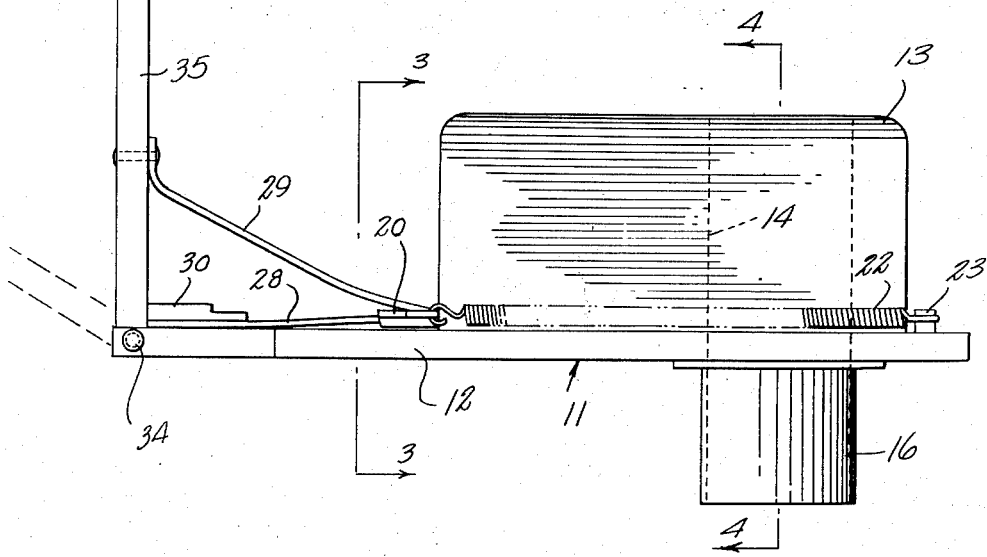
Figure 2 is a side elevational view of the trap of Figure 1 shown in sprung position, as in Figure 1.

Designated at 35 is a bar member which is pivoted at 34 to the end of the base member 12, and whose intermediate portion is connected to the ends of the section 29 of flexible strip 26. When the trap is set in the manner shown in Figure 6, the bar 35 is in a position defining a small acute angle to the horizontal. When the trap is sprung, the bar member 35 is elevated to a substantially vertical position, as shown in Figure 2. Secured to the free end of the bar member 35 is a flag 36, which may be of any suitable flexible colored material.

In using the trap, the tubular member 16 is inserted into a burrow opening through which gophers are known to pass, and the trap is set by engaging disc member 30 with the top end of the wall of the vertical bore 14. As above explained, when a gopher attempts to leave the burrow through the vertical passage defined by member 16, opening 15 and bore 14, the disc member 30 is pushed out of engagement with the top end of the wall of bore 14 and the trap is sprung, whereby the gopher is caught by the prongs 24 when the plate member 18 moves inwardly by the contraction of springs 21 and 22. At the same time, the bar 35 is rotated to a substantially vertical position, elevating the flag 36 and providing a signal that an animal has been caught in the trap.

While a specific embodiment of an improved gopher trap has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An animal trap of the character described comprising a base member having an opening therein adapted to be positioned over the entrance to an animal burrow, a block member on said base member registrable with the entrance, said block member having a bore at right angles to the base member in alignment with said opening, a horizontal plate member slidably mounted on said base member, said block member being slotted adjacent the bottom of said bore to receive said plate member, spring means adapted to bias the forward end of said plate member into said bore, a shouldered catch member engageable with the top of the wall of said bore in obstructing relation thereto and being disengageable responsive to an upward thrust thereon, and a flexible member tensionally connecting said catch member to said plate member and arranged to hold said plate member out of said bore when the catch member is engaged with the top of the wall of said bore.

2. An animal trap of the character described comprising a base member adapted to be positioned over the entrance to an animal burrow, a block member rigidly secured on said base member, said block member and base member being formed to define a vertical passage registrable with the entrance, a horizontal plate member slidably mounted on said base member, said block member being slotted at its end adjacent said base member to receive said plate member in said vertical passage, spring means biasing the forward end of said plate member into said passage, a plurality of prongs on the forward end of said plate member, a catch member overlying the top of said passage and having a shoulder engaging the side of said passage and being disengageable responsive to an upward thrust thereon, and a flexible member tensionally connecting said catch member to said plate member and arranged to hold said plate member out of said passage when the catch member is engaged with the top of the wall of said passage.

3. An animal trap of the character described comprising a base member adapted to be positioned over the entrance to an animal burrow, a block member rigidly secured on said base member, said block member and base member being formed with an opening to define a vertical passage registrable with the entrance, a horizontal plate member slidably mounted on said base member, said block member being slotted at its bottom to receive said plate member in said vertical passage, spring means biasing the forward end of said plate member into said passage, a plurality of prongs on the forward end of said plate member, a disc-like shouldered catch member engageable with the top of the wall of said passage at one side thereof and being disengageable responsive to an upward thrust thereon, a flexible member tensionally connecting said catch member to said plate member and arranged to hold said plate member out of said passage when the catch member is engaged with the top of the wall of said passage, a depending tube secured to said base member in registry with said vertical passage, an indicator pivoted to said base member, and means connecting said indicator to said plate member and arranged to elevate said indicator responsive to the movement of said plate member into said passage.

JOHN NANTT.

References Cited in the file of this patent

UNITED STATES PATENTS

| Number | Name | Date |
|---|---|---|
| 879,010 | Schmitt | Feb. 11, 1908 |
| 1,102,049 | Hollis | June 30, 1914 |
| 1,807,463 | Anderson | May 26, 1931 |